Feb. 28, 1956 A. J. RADCLIFFE, JR 2,736,886

TELEPHONE SYSTEM PROVIDING TIME-DELAYED DISTINCTIVE CALL SIGNALLING

Filed May 3, 1952

INVENTOR:
ARTHUR J. RADCLIFFE JR.
BY John J. Bellamy
ATTORNEY

United States Patent Office 2,736,886
Patented Feb. 28, 1956

2,736,886

TELEPHONE SYSTEM PROVIDING TIME-DELAYED DISTINCTIVE CALL SIGNALLING

Arthur J. Radcliffe, Jr., La Grange, Ill., assignor to International Telephone and Telegraph Corporation, a corporation of Maryland Application May 3, 1952, Serial No. 285,940
3 Claims. (Cl. 340—286)

This invention relates to a telephone system providing time-delayed distinctive call signalling, although certain of its features are not limited specifically thereto.

The main object of the invention is to provide simple and reliable circuit structure permitting an operator, particularly during a busy calling period, to distinguish between lighted line lamps (or other call-signal devices) indicating unanswered calls just initiated and those indicating calls that have remained unanswered for more than a predetermined interval, to the end that the operator (or operators) may avoid keeping certain calls waiting unduly long, as by unknowingly first answering other calls which have been waiting a lesser time.

A further object is to provide circuit structure of the indicated character which can be applied simply and economically to manual switchboards of existing standard construction and wiring.

A still further object is to provide circuit structure permitting the period of delay preceding the placing of a call in the delay-answer class to be readily adjusted, whereby (among other things) the required time-delay measuring apparatus does not have to be manufactured within close and precise tolerances.

A further object is to provide timing devices which will restore, or recover, quickly enough to prevent cumulating the timing operation incident to two or more calls quickly following one another over the same line or trunk.

GENERAL DESCRIPTION

It has been chosen to illustrate the invention as applied to a conventional plug-and-jack type of manual switchboard terminating subscriber lines for interconnection through the usual double-plug cord circuits. In such a system, each line is commonly provided with a line and a cutoff relay, and with a jack on the face of the switchboard, or with multipled jacks at the respective sections of the larger, multipled boards. Each line has a line lamp, controlled by its line relay and associated with its jack, to indicate a call when lighted. On many multipled switchboards each line may have multipled line lamps appearing at respective selected sections incident to an arrangement for sharing the answering load among the several operators.

In the chosen illustrated embodiment, each line is provided with an individual lamp-control timing device controlled by the line relay over the individual lamp wire extending therefrom, such wire being rerouted through the timing device. The timing device preferably takes the form of a switching relay and thermionic tube apparatus controlled over the relay end of the lamp wire at the end of the discharge period of a condenser to switch the lamp end of the wire to a source of flashing current, whereby the initial steadily lighted condition of the line lamp is changed to a flashing condition if the call remains unanswered for more than a given interval, such as ten seconds, for example.

One feature of the invention, is that the application of lamp-lighting potential by the line relay provides a source of cathode-anode current for the noted control tube, and simultaneously acts through the timing condenser to apply a blocking potential to the control grid of the tube to thereby block the flow of relay-operating current therethrough until the noted condenser-applied blocking potential has leaked off.

A further feature concerns controlling the value of the blocking potential, and thereby the time required for it to leak off, by controlling the normal non-blocking potential of the control grid.

A further feature concerns the provision of a rectifier connected in bypassing relationship to the grid leak resistor and so poled as not to interfere with the timing operation but to permit a rapid return of the control grid to its noted normal potential when the associated line relay restores.

Other objects and features will appear hereinafter.

*The drawings*

The accompanying drawings, comprising Figs. 1 to 3, show sufficient of the apparatus incorporated in a system embodying the invention to enable the invention to be understood.

Figure 1:
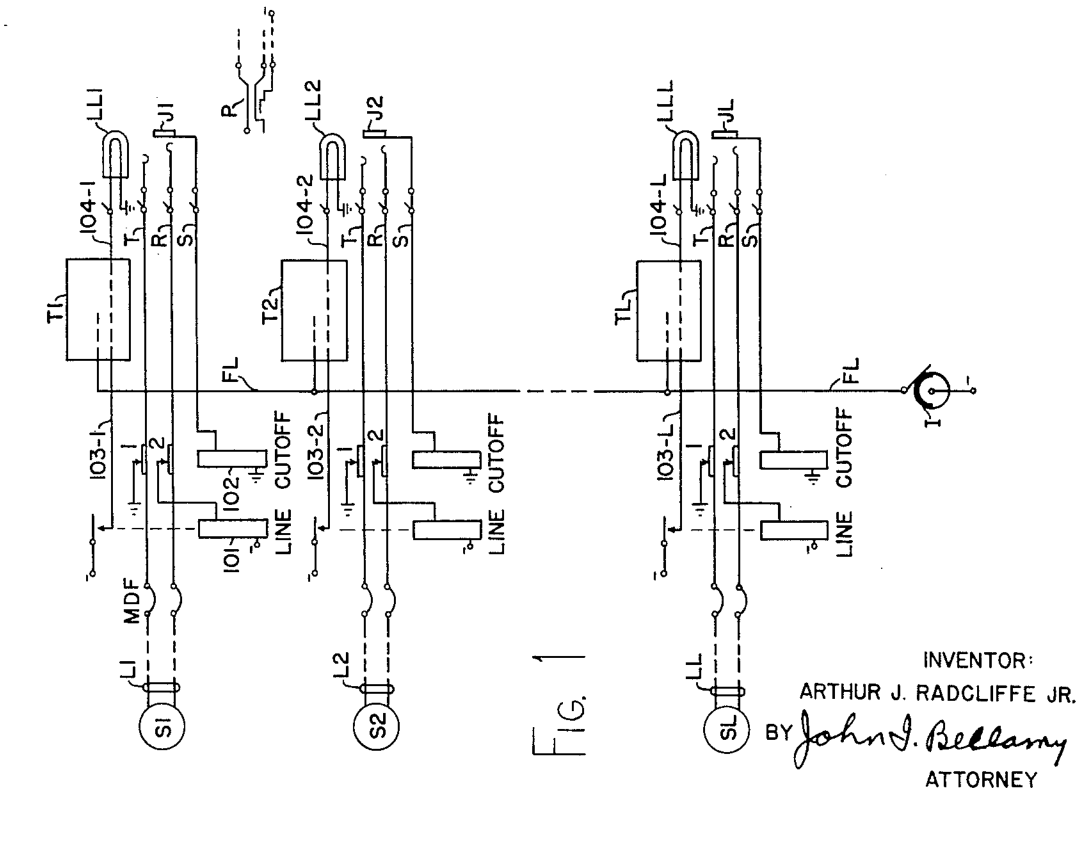
Fig. 1 shows a schematic circuit diagram of a portion of a telephone system employing the invention.

Fig. 1 shows three subscriber lines of a manual telephone system being the first, second, and the last lines (L1, and L2, and LL) of any desired number of such lines. These lines serve stations S1, S2, and SL respectively. The illustrated subscriber lines are connected to the switchboard apparatus through a main distributing frame MDF, in the usual manner. The illustrated lines terminate respectively in jacks J1, J2, and JL, with which the line lamps LL1, LL2, and LLL are associated. Each line has a line relay (101 for line L1) to signal the operator by lighting their respective line lamps over wires 103—1 to 103—L. A cutoff relay (102 for line L1) is provided to disconnect the associated line relay when a plug, such as P, is inserted into the associated jack. The four illustrated wires extending to any jack J1 to JL and associated line lamp may be multipled to appear in front of other operators, according to the usual practice.

Interrupter I is provided to effect the flashing of any line lamp (and its multiples, if any) when switched over by its associated timer T1 to TL.

DETAILED DESCRIPTION

*Figure 1*

Referring now to Fig. 1, and particularly to line L1, line relay 101 operates over line L1, and through contacts 1 and 2 of cutoff relay 102, when the subscriber at station S1 removes the receiver (not shown). The line relay 101 applies a steady negative potential from the ungrounded negative pole of the usual exchange battery to wire 103—1 to light lamp LL1 steadily through timer T1 and over wire 104—1. As hereinafter explained, the timer T1 is started by this operation.

If the call remains unanswered for longer than the predetermined interval, the timer T1 operates as hereinafter described and disconnects wire 104—1 from the steadily energized wire 103 and connects it to flashing wire FL which is supplied with interrupted current by interrupter I. Lamp LL1 thereafter flashes as long as line relay 101 remains operated.

When the operator inserts a plug, such as P into the jack J1, thereby making the usual connection to wires T, R, and S, cutoff relay 102 is operated over wire S to disconnect line relay 101, which thereupon restores to deenergize wire 103—1. The lamp LL1 is thereby extinguished, and timer T1 is cleared out as hereinafter described.

Figure 2:
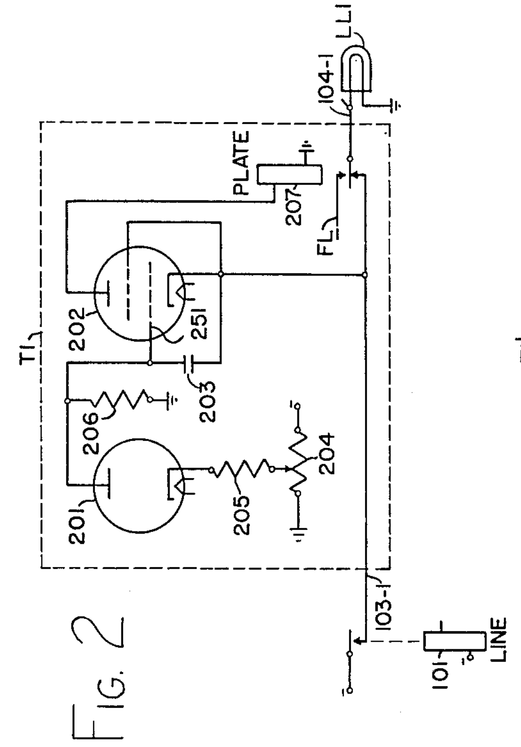
Fig. 2 shows the timer T1 of Fig. 1 in circuit diagram.

*Figure 2*

Referring now to Fig. 2, the detailed operation of timer T1 of Fig. 1 will be described, keeping in mind that the timers T2 to TL of Fig. 1 are similar.

When the line relay 101 operates, the negative potential (48 volts, for example) of the ungrounded pole of the exchange battery is applied to wire 103—1 to light line lamp LL1 through the back contacts of the plate relay 207, and over wire 104—1. Lamp LL1 is thereby lighted steadily. The negative potential on wire 103—1 also starts the timing cycle of timer T1 rendering the cathode and connected shield grid negative so as to provide a path for the flow of cathode-anode current, but the negative potential on the cathode passes through condenser 203 to the control grid 251, thereby rendering the control grid more negative (by about the potential of the exchange battery) than it normally is.

Normally, with the line relay 101 unoperated, control grid 251 is supplied with a desired non-cutoff potential, through the slide arm of potentiometer 204, and diode 201. The ground-connected grid resistor 206 thus continuously draws current, but does not materially thereby lower the normal grid potential because of the high resistance of resistor 206.

Since the upper plate of timing condenser 203 is connected to control grid 251, and the lower plate is connected normally to ground through lamp LL1 and its multiplier, the condenser 203 is normally charged to a potential difference equal to the negative potential (with respect to ground) on grid 251. Accordingly, the described application of negative potential (in place of the normal ground potential through lamp LL1) to the cathode of tube 202 and to the lower plate of condenser 203 increases the negative potential on the upper plate of condenser 203 (and consequently the potential of grid 251) by substantially the potential of the exchange battery. Grid 251 is thereby biased substantially beyond the cutoff point of tube 202, whereby no cathode-anode current flows therethrough for the time being.

When the grid 251 thus becomes biased more negatively than the normal source of biasing potential the flow of current through diode rectifier 201 ceases, but the current flow through grid resistor 206 is correspondingly increased.

At the end of a time interval which depends on the capacity of condenser 203 in relation to the resistance of element 206, the high negative potential on grid 251 has been reduced (by leakage current through resistor 206) to a conducting value. Current thereupon flows in the cathode-anode path of tube 202, operating plate relay 207 over wire 103—1. On operating, relay 207 disconnects lamp LL1 from wire 103—1 and transfers it to the flashing wire FL, which is supplied with intermittent current by the interrupter I. Lamp LL1 thereafter flashes to inform the operator that the associated call has waited for the length of the timing interval.

When the operator answers the call (by inserting a plug such as P into jack J1 or a multiple thereof), the cutoff relay 102 is operated over wire S to disconnect the line relay 101, which thereupon restores to deenergize wire 103—1. The current flow through the cathode-anode path of tube 203 thereupon ceases, and plate relay 207 responsively restores. Lamp LL1 is thereby transferred back to the now deenergized lamp wire 103—1, and consequently becomes extinguished.

With ground potential from line lamp LL1 applied over wire 103—1 to the lower plate of condenser 203, the potential on the upper plate of condenser 203 is momentarily less negative than its normal potential whereupon a comparatively large current flows through the diode rectifier 201 to recharge the condenser 203 quickly to its normal value. This recharging current flows through lamp LL1, to ground, and is limited by resistor 205 to the safe carrying capacity of diode 201. By this provision the timer T1 is quickly returned to normal timing condition, which is important when calls over the same line closely follow each other.

As noted, timing interval of timer T1 is roughly fixed by the resistance value of grid leak resistor 206 in relation to the capacity of condenser 203. The fine adjustment of the timer comprises setting the slide arm of the potentiometer 204 to the desired point. For example, if (1) the unground pole of the exchange battery has a negative potential of 48 volts, (2) resistor 206 has a resistance value of 2 megohms, (3) condenser 203 has a capacity value of 2 mf., and if (4) the potentiometer is set for the maximum negative voltage (48 v.), then the time is a definite interval which is somewhere between fourteen and twenty seconds (say 14.8). If the slide arm of the potentiometer 204 is reset at a negative potential of 30 volts, for example, then the delay time will be approximately nine seconds. If the slide arm is reset at the grounded end of the potentiometer the delay time would be substantially zero. Therefore, with the noted values for resistor 206 and condenser 203 the delay time may be varied from zero to approximately fifteen seconds by positioning the slide arm of the potentiometer.

The diode rectifier 201 may be one-half of the commerically available 6AL5 twin-diode, and the tube 202 may be the 5696 tetrode.

Figure 3:
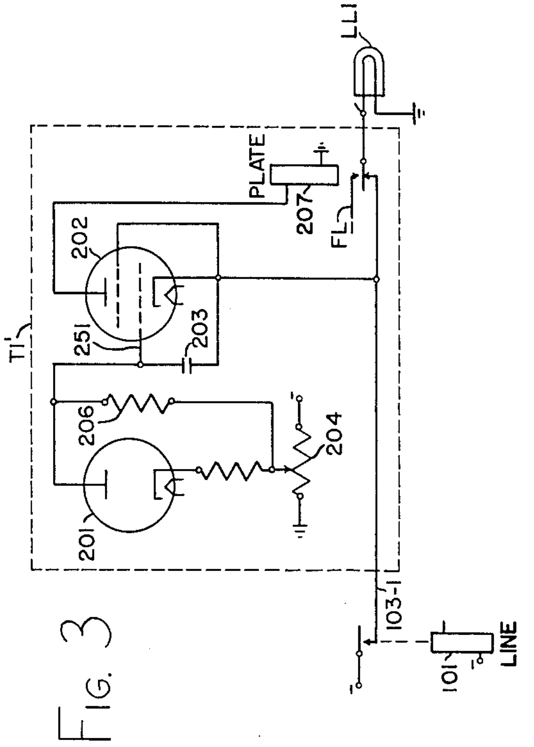
Fig. 3 shows the timer T1', being a desirable modification of the timer T1.

*Figure 3*

Fig. 3 shows a timer T1′, which is a modification of the timer T1, of Fig. 2. Timer T1′ has the same circuit arrangement as timer T, except that the grid leak resistor 206 of T′ connected to the slide arm of potentiometer 204 instead of directly to ground as in the timer T1.

The timer T1′ operates in the same manner as described for timer T1, of Fig. 2, except for the effect of the altered connection to the lower terminal of element 206. In timer T1′ the same negative potential is normally applied to both ends of resistor 206, being the potential determined by the setting of the slide arm of the potentiometer 204. Therefore, no current normally flows thorugh the resistor 206 in Fig. 3. A more important difference is that a longer timing interval is accomplished with T1′. With the leak path return connected to the same source of normal charge potential, rather than to ground, the discharge potential across resistor 206 during a timing interval is less than in Fig. 2, wherefore a longer interval elapses before the tube 202 conducts. If this longer interval (for a given setting of device 204) be not desired, the grid leak resistor 206 of Fig. 3 may be of a lower resistance value.

As a further advantage, the grid-leak connection of timer T1′ provides an alternative path for eventually returning the control grid to its normal potential after use of the timer, in the event that the diode 201 is inoperative. In that event, however, the quick recovery feature is absent.

I claim:

1. In a timing device, an electronic tube having a cathode, an anode, and a control electrode, circuit elements providing a circuit path through the cathode and anode in series with a source of direct current, said circuit path being normally complete except for an open point between the negative pole of the current source and the cathode, a signal device connected in parallel with the cathode-anode circuit path, a control bridge connected between the cathode and the said current source and including a grid resistor and a timing condenser in series, the timing condenser being located between the grid resistor and the cathode, a connection from the junction of the grid resistor and condenser to said control electrode, means including said control bridge for maintaining said condenser normally charged to render the control electrode normally more negative than the cathode, means for closing said open point, thereby changing the potential of the cathode from positive to negative and energizing said signal device, said condenser acting to increase the said negative potential on the control electrode by substantially the value of the negative potential applied to the cathode, whereby the flow of cathode-anode current is blocked until some of the normal charge of the condenser has leaked off through said grid resistor.

2. In a timing device as set forth in claim 1, means responsive to the subsequent flow of cathode-anode current for transferring said signal device to another circuit path until the said one point is reopened, said means including an electromagnetic relay connected in the cathode-anode circuit path.

3. In a timing device as set forth in claim 1, the said means for maintaining the condenser normally charged including a relatively low-resistance charging circuit path connected in by-passing relationship to the grid resistor to enable the condenser to become quickly recharged following a use of the timing device, and a one-way conducting device connected in the said charging path to prevent discharge of the condenser therethrough when the said one point is closed.

References Cited in the file of this patent

UNITED STATES PATENTS

| | | |
|---|---|---|
| 1,742,927 | Nicoll et al. | Jan. 7, 1930 |
| 2,396,898 | Storm | Mar. 19, 1946 |